Dec. 23, 1958 W. M. CHALMERS ET AL 2,865,650
AIR CUSHION SUSPENSION FOR AUTOMOBILE VEHICLES
Filed Feb. 11, 1957 4 Sheets-Sheet 1

INVENTORS
WILLIAM M. CHALMERS,
& MATT MAHARICK
BY
RICHEY, WATTS, EDGERTON,
McNENNY & FARRINGTON
ATTORNEYS

Dec. 23, 1958  W. M. CHALMERS ET AL  2,865,650
AIR CUSHION SUSPENSION FOR AUTOMOBILE VEHICLES
Filed Feb. 11, 1957  4 Sheets-Sheet 2
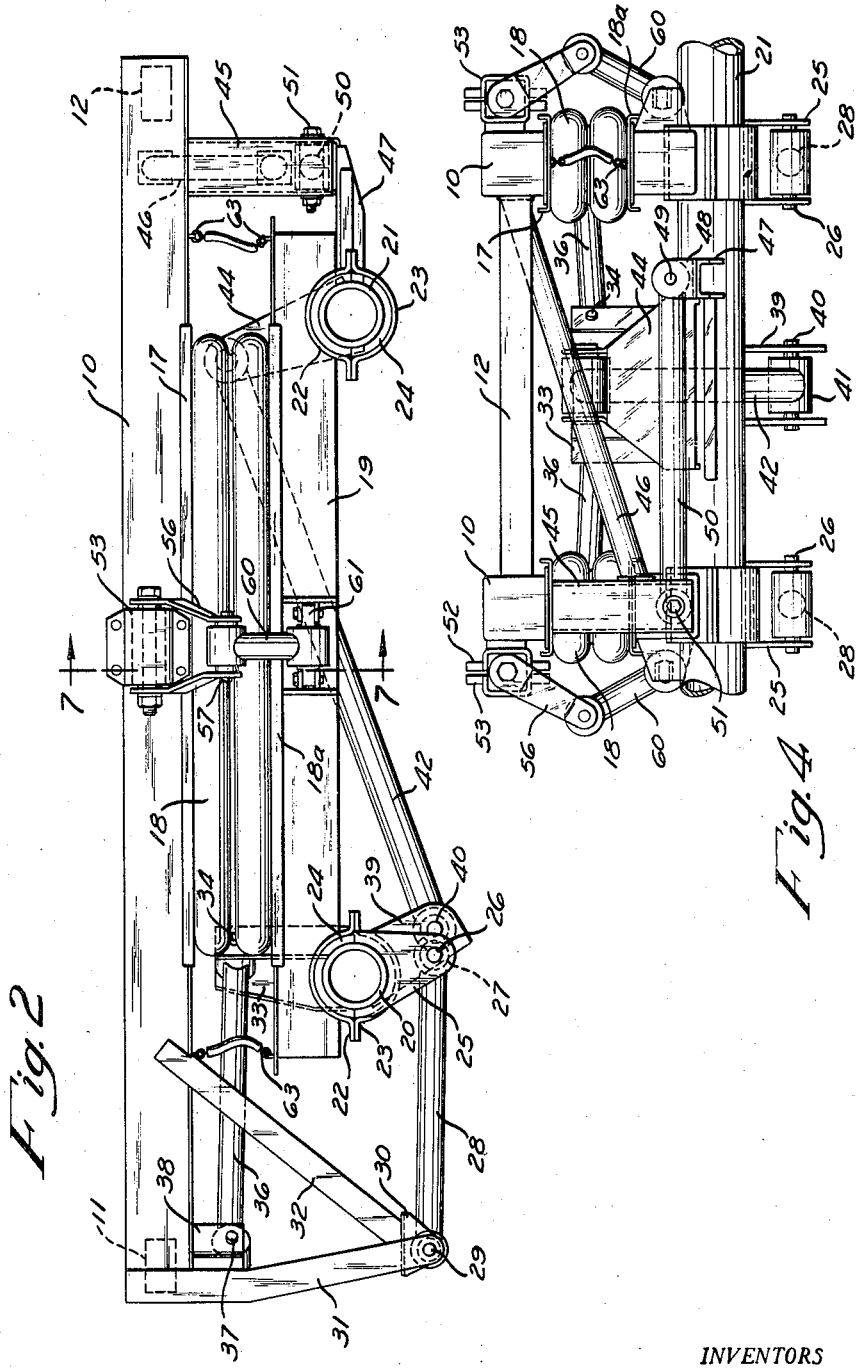
INVENTORS
WILLIAM M. CHALMERS,
& MATT MAHARICK
BY
RICHEY, WATTS, EDGERTON,
McNENNY & FARRINGTON
*G.H. Edgerton*
ATTORNEYS

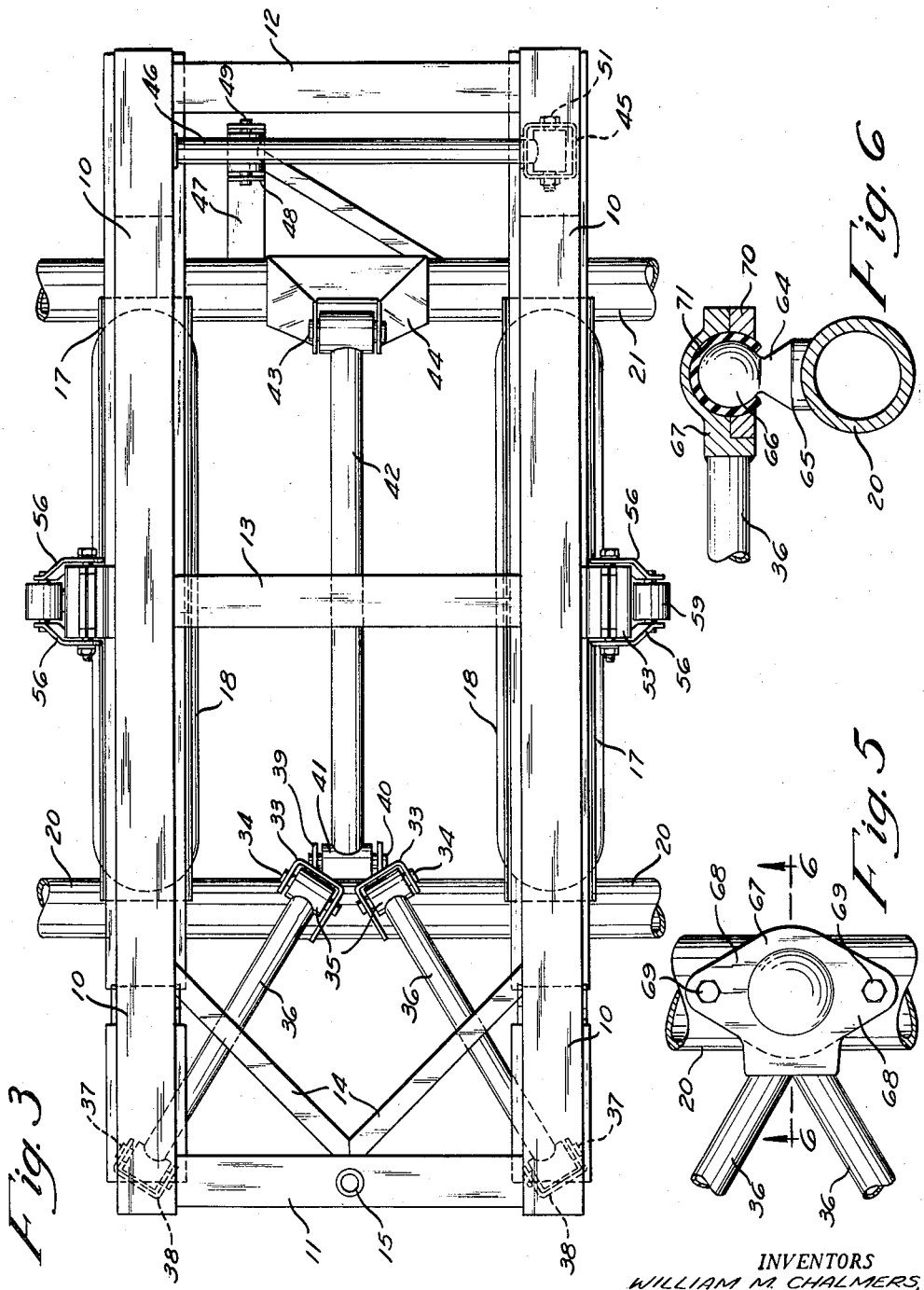

United States Patent Office 2,865,650
Patented Dec. 23, 1958

2,865,650

AIR CUSHION SUSPENSION FOR AUTOMOBILE VEHICLES

William M. Chalmers and Matt Maharick, Niles, Ohio, assignors to Youngstown Steel Car Corporation, Niles, Ohio, a corporation of Ohio Application February 11, 1957, Serial No. 639,492

6 Claims. (Cl. 280—104.5)

This invention relates broadly to improvements in undercarriages for pneumatic spring suspension assemblies for motor vehicles, and more specifically to an organization of framing members for controlling the movement of the air cells and the stabilization of the body carried thereby.

The objects of the invention reside in the provision of an undercarriage for a dual axle vehicle which is constructed to afford vertical movement between the axles and the vehicle body, restrain side sway thereof, prevent lineal movement of the undercarriage following the application of the brakes, maintain tracking alignment of the wheels and stabilize the body when it is improperly loaded or the vehicle is operated on a crowded highway.

Other objects and advantages more or less ancillary to the foregoing, and the manner in which all the various objects are realized, will appear in the following description, which considered in connection with the accompanying drawings, sets forth the preferred embodiment of the invention.

Referring to the drawings:

Fig. 2 is a side elevational view thereof;

Fig. 3 is a plan view of the undercarriage;

Fig. 4 is an end elevational view thereof;

Fig. 5 is a plan view of an alternate flexible coupling structure for the forward axle;

Fig. 6 is a vertical sectional view thereof, the section being taken on a plane indicated by the line 6—6 in Fig 5.

Figure 1:
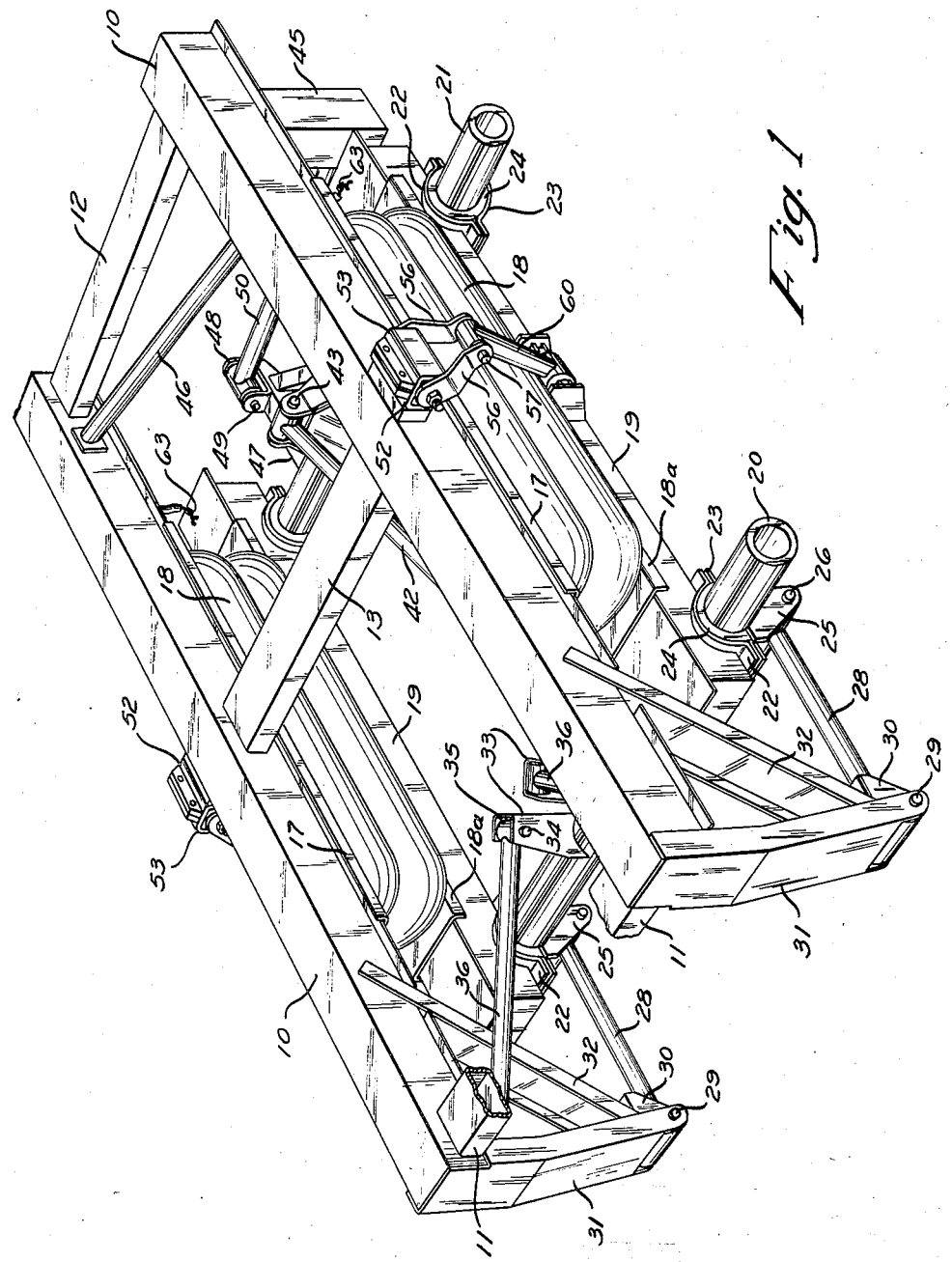
Fig. 1 is a view in perspective of the improved undercarriage for the pneumatic suspension assembly, the forward frame member that unites the major beams of the structure being broken away in the interest of clarity.

Referring first to Fig. 1, the pneumatic spring suspension assembly comprises an undercarriage or subframe embodying a pair of parallel hollow beams 10 of rectangular cross section for the support of the vehicle body. The beams are united adjacent their ends by similar fabricated steel frame members 11 and 12 and by a similar central cross member 13. The forward frame member 11 is braced against lateral strains by convergent angle irons 14 welded to the center of the frame member and to the sides of the beams 10. The frame member 11 is formed with a trunnion 15 in the center thereof to facilitate the bolted securement of the vehicle body. The lower faces of the beams 10 are provided with shallow channel irons 17 having rubber air cells 18 vulcanized thereto and similar inverted channels 18a vulcanized to the opposed faces of the air cells for the retention of the assembly upon fabricated steel bolsters 19 affixed respectively to the vehicle axles 20 and 21. The axles are retained by an upper bearing cap 22 welded to the lower face of the bolster, and a lower cap 23 bolted thereto, rubber bushings 24 being interposed between the caps which are clamped in intimate engagement with the axle. The outer end portions of the forward axle 20 are provided with depending brackets 25 which are fabricated to support pins 26 having rubber sleeves 27 thereon engaged with journal bearings on the ends of stay rods 28 mounted for rotational movement about the pins 26. The outer ends of the rods 28 are similarly pivoted on rubber clad pins 29 supported in brackets 30 welded to depending arms 31 affixed upon the ends of the beams 10. The arms 31 are braced against lineal strains by channel irons 32 welded to the base of the arms 31 and to the outer faces of the beams 10 above the forward ends of the bolsters 19. The central portion of the axle 20 has a pair of vertically disposed brackets 33 welded thereon which are fabricated to retain rubber clad pins 34 thereon. The pins are engaged in journal bearings 35 formed in the ends of divergent stay rods 36 retained by similar rubber clad pins 37 thereon supported in brackets 38 (Figs. 2 and 3) welded to the lower faces of the beams 10. The axle 20 is further provided with a depending bracket 39 welded upon the lower face thereof subjacent the brackets 33. The bracket 39 is formed to retain a rubber clad pin 40 which is engaged with a journal bearing 41 in a stay rod 42 connected at its opposed end through a rubber clad pin 43 to a vertically disposed bracket 44 welded to the upper face of the axle 21. The stay rod 42 maintains lineal alignment of the front and rear wheels, and permits vertical movement of the axles 20 and 21 relative to each other caused by irregularities in the surface of the road.

The left beam 10 is framed with a fabricated steel post 45 depending from the end thereof which has a diagonal tube 46 welded to the lower end thereof and to the right beam 10. The outer rearward face of the rear axle 21 has a horizontal bracket 47 welded thereon which terminates with vertically disposed ears 48 carrying a pin 49 with a rubber sleeve thereon which carries a stay rod 50. The bracket 47 is braced against lateral strains by a channel iron affixed to the end thereof and the axle 21. The opposed end of the stay rod is journaled on a rubber clad pin 51 which is mounted in an opening in the lower end of the post 45. The rod 50 restrains undue lateral movement of the axle relative to the beams 10.

Figure 7:
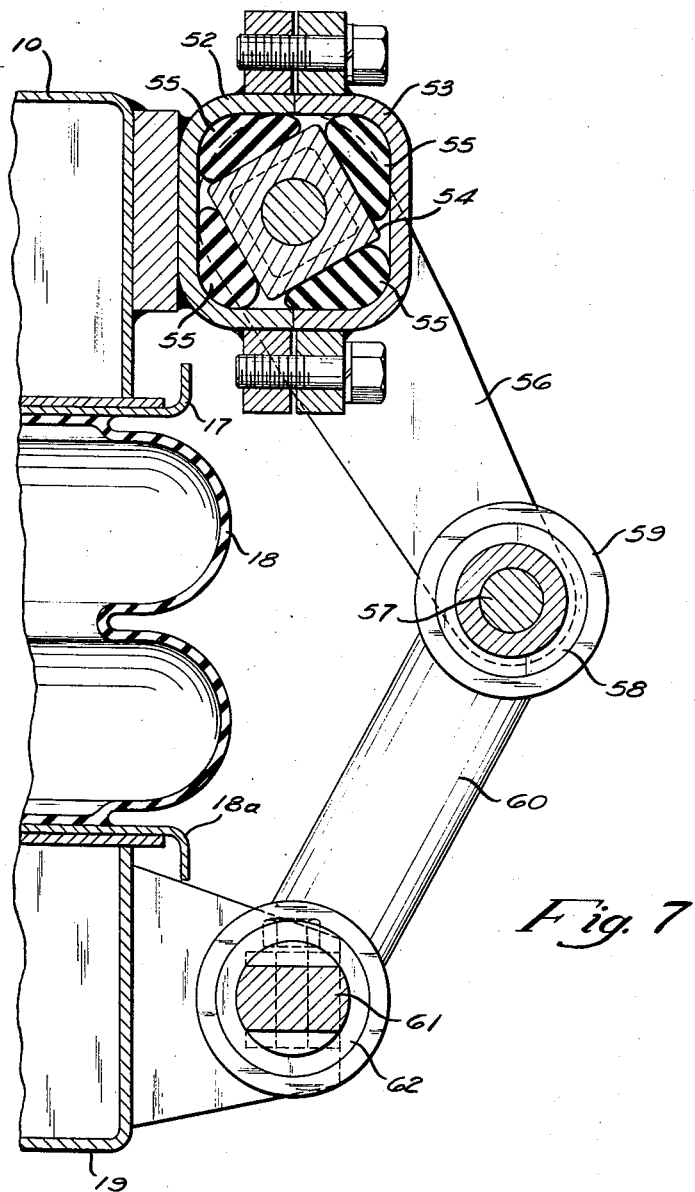
Fig. 7 is a vertical sectional view shown on an enlarged scale through one of the rebound mechanisms, the section being taken on a plane indicated by the line 7—7 in Fig. 2.

The beams 10 and bolsters 19 are interconnected through vertically yieldable linkage assemblies each comprising a bracket 52 affixed to the central portions of the beams. The brackets are provided with bearing caps 53, the brackets and caps defining a cavity of square cross section which carry square pins 54 somewhat smaller than the cavities in the brackets and caps. The corners of the pins confront the flat sides of the cavity in the brackets and caps and cylindrical rubber bars 55 are pressed into the corners of the cavity against the flat faces of the pins 54 (Fig. 7). The ends of the pins 54 are keyed to links 56 that support a second pin 57 having rubber sleeves 58 thereon which engage journal bearings 59 on a link 60. The links 60 in turn, are journaled on pins 61, having rubber sleeves 62 thereon which are mounted in brackets affixed to the bolsters 19. As flexure of the air cells occurs, due to undulations in the road, the pins will be rotated and deform the rubber cylinder 55, thus restraining excessive vertical movement between the beams 10 and bolsters 19.

The beams 10 and bolsters 19 are further interconnected by chains 63 preferably covered with rubber hose which are of an adequate length to delimit excessive vertical movement of the beams 10 when the wheels of the vehicle encounter obstructions in the roadway, or when the body is tilted sidewise as the vehicle negotiates sharp turns in the highway.

In the modified tie rod coupling illustrated in Figs. 5 and 6, the structure comprises a vertical bracket 64 having a flanged base 65 which is welded to the axle 20 and a spherical upper end 66 thereon. The stay rods 36 are affixed in a bearing block 67 having lateral flanges 68 thereon which are drilled to receive bolts 69 for the support of a lower cap 70. The block and cap are then machined to receive hemispherical rubber caps 71 which are seated on the spherical end 66 of the bracket 64. This structure provides a universal joint for the stay rods and accommodates accurate movement thereof as the axle is moved vertically or in an oblique horizontal plane.

The beams 10 and the bolsters 19 are formed of fabricated steel blanks either of which may be welded to form air tight chambers or surge tanks for the air cells 18. The chambers are connected to the air cells through pressure valves (not shown) to maintain the uniform height of each air cell consonate the load imposed thereon.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. An undercarriage for an air spring suspension assembly comprising a pair of parallel beams, cross members affixed thereto, a front axle, bolsters yieldably mounted thereon subjacent said beams, air cells intermediate said beams and said bolsters, arms depending from the forward ends of said beams, a pair of stay bars between said arms and said axle, rubber clad pin connections on each end of each stay bar, a pair of secondary stay bars between the outer ends of said beams and the central portion of said axle, rubber clad pin connections on each end of each secondary stay bar, a rear axle on said bolsters, a third stay bar between the upper face of said rear axle and the lower face of said front axle, rubber clad pin connections on each end of the last named stay bar, a post depending from the rearward end of one of said beams, a horizontal bracket affixed to said rear axle, a fourth stay bar between said post and said bracket, rubber clad pin connections on each end of said fourth stay bar, hinged link assemblies between said beams and said bolsters, a rubber torsion member in one of the hinged connections of said hinged link assemblies, and rubber clad pins in the other hinged connections in said hinged link assemblies.

2. An undercarriage for an air spring suspension assembly comprising a pair of parallel beams, cross members affixed thereto, a front axle, bolsters yieldably mounted thereon subjacent said beams, air cells intermediate said beams and said bolsters, arms depending from the forward ends of said beams, a pair of stay bars mounted for universal movement between said arms and said axle, a pair of secondary stay bars mounted for universal movement between the central portion of said axle and the forward ends of said beams, a rear axle on said bolsters, a third stay bar mounted for universal movement between the upper face of said rear axle and the lower face of said front axle, a post depending from the rearward end of one of said beams, a horizontal bracket affixed to said rear axle, a fourth stay bar mounted for universal movement between said post and said bracket, hinged link assemblies between said beams and said rear bolsters, a rubber torsion member in one of the hinged connections in said link assemblies, and pins mounted for universal movement in the other hinged connections in said link assemblies.

3. An undercarriage for an air spring suspension assembly comprising a pair of parallel beams, cross members affixed thereto, a front axle, bolsters yieldably mounted thereon subjacent said beams, air cells intermediate said beams and said bolsters, arms depending from the forward ends of said beams, stay bars pivoted thereto and to said axle, a rear axle on said bolster, a second stay bar pivoted to the bottom of said front and to the top of said rear axle, a post depending from an end portion of one of said beams, a rearwardly directed horizontal bracket on said rear axle, a third stay bar pivoted to said post and said horizontal bracket, a diagonal brace affixed to said post adjacent the base thereof and to the opposite beam, and torsion snubber means between said beams and said bolsters.

4. An undercarriage for an air spring suspension assembly comprising a pair of parallel beams, cross members uniting said beams, a front axle, bolsters mounted thereon subjacent said beams, air cells intermediate said beams and said bolsters, brackets depending from the forward ends of said beams, stay bars pivoted for vertical movement between the lower faces of said axle and said brackets, second stay bars pivoted to the forward ends of said beams and to the upper face of said axle, a rear axle on said bolsters, a third stay bar pivoted for vertical movement between the bottom of said front and the top of said rear axle, a post depending from one of said beams, a fourth transversely disposed stay bar pivoted for vertical movement between said rear axle and said post, a rod intermediate said post and the opposed beam, and snubber means between said beams and said bolsters to restrain vertical movement of said axles relative to said beams.

5. An air spring undercarriage comprising parallel beams, parallel bolsters subjacent thereto, air cells intermediate said bolsters and said beams, front and rear axles mounted on said bolsters, snubbers intermediate said beams and said bolsters to delimit vertical movement thereof, depending brackets on the forward ends of said beams, parallel stay bars pivoted for vertical movement between said front axle and said bracket, convergent stay bars pivoted on the forward ends of said beams, and to the top of said front axle, a third stay bar parallel said beams pivoted for vertical movement between the bottom of said front and the top of said rear axle, a post depending from one of said beams, and a fourth transverse stay bar pivoted for vertical movement between said rear axle and said post, said convergent stay bars and said horizontal stay bars restraining transverse movement of said axles.

6. An undercarriage for an air spring suspension assembly comprising a pair of parallel beams, cross members affixed thereto, a front axle, bolsters yieldably mounted thereon subjacent said beams, air cells intermediate said beams and said bolsters, arms depending from the forward ends of said beams, a pair of horizontal stay bars pivotally mounted on said arms and on said axle, a pair of diagonal stay bars pivotally mounted on the outer ends of each beam and pivoted to said axle adjacent the center thereof, a rear axle on said bolsters, a depending bracket on said front axle, an upstanding bracket on said rear axle, a diagonal stay rod pivotally uniting said brackets on said front and said rear axles, a post affixed to and depending from the rearward end of one of said beams, a tube affixed to the beam opposite said post and to the lower end of said post, a rearwardly directed horizontal bracket on said rear axle adjacent the side thereof opposite said post, a fourth stay rod parallel said axle and pivotally mounted on the last named bracket and on said post to restrain lateral movement of the axle relative to said beams when said air cells are flexed.

References Cited in the file of this patent

UNITED STATES PATENTS

| | | |
|---|---|---|
| 2,508,634 | Ziegler | May 23, 1950 |
| 2,579,556 | Drong | Dec. 25, 1951 |
| 2,742,301 | Pointer | Apr. 17, 1956 |
| 2,743,939 | Reid | May 1, 1956 |
| 2,784,980 | Norrie | Mar. 12, 1957 |